March 4, 1969  G. B. RENNER ET AL  3,430,552
COFFEE MAKING APPARATUS
Filed Nov. 8, 1967

Inventors:
George B. Renner
Floyd A. Blashfield
By: Zabel, Baker, York,
Jones & Dithmar
Attorneys

United States Patent Office 3,430,552
Patented Mar. 4, 1969

3,430,552
COFFEE MAKING APPARATUS
George B. Renner, Prospect Heights, and Floyd A. Blashfield, Evanston, Ill., assignors to Frank J. Renner, Arlington Heights, and William M. Renner and George B. Renner, Prospect Heights, Ill.
Filed Nov. 8, 1967, Ser. No. 681,419
U.S. Cl. 99—283     7 Claims
Int. Cl. A47j 31/00

ABSTRACT OF THE DISCLOSURE

Coffee making apparatus comprises a fluid circuit including a metering device, a water heater, an extractor, and a dispensing reservoir. The can in which the ground coffee is packed constitutes the extracting chamber, and communication with the fluid circuit is made by piercing pins which perforate the can. The metering device comprises a piston in a double ended cylinder having inlet and outlet ports at each end. The movement of the piston and its piston rod actuates switching mechanism which controls solenoid valves associated with the inlets and outlets to effect flow reversal to the cylinder. The movement of the piston rod also actuates a counter switch which controls the number of cycles through a stepping switch and a latching relay, shutting off the flow through the water heater and extractor after a predetermined number of cycles. Operation is initiated by a start switch feeding into the latching relay.

---

This invention relates to coffee making apparatus of the can piercing type.

It is an object of our invention to provide coffee making apparatus which will make fresh brewed coffee of uniform strength.

The usual arrangement in coffee making apparatus of the pressure extraction type is to control the volume of water forced through the ground coffee by shutting off the water after a predetermined length of time, as by a timer actuated solenoid valve. A restriction is located in the fluid circuit between the water heater and the extractor and is adjustable so that it can be set for the water main pressure at a particular location. However in an arrangement where the coffee can constitutes the extraction chamber, it has been found that there are wide variations in strength which cannot be explained by variations in line pressure. It is believed that this is due to a swelling of the ground coffee in the can, when moistened, to a greater or lesser extent depending on the type of coffee bean, and the density of packing. This swelling causes wide variations in flow rate. Thus the strength of the extract will vary unpredictably.

The use of a level responsive control to terminate the flow also causes variation in strength depending upon the amount of coffee remaining in the reservoir when the brew cycle is initiated.

According to our invention we provide a metering device in the fluid circuit which can be set to feed a predetermined volume of water to the extractor. Thus the swollen condition of the grounds in the can or variation in line pressure and the consequent variation in flow rate does not affect the volume of water used in extraction.

A further object is to provide coffee making apparatus of the type described in which the metering device embodies a minimum amount of hydraulic mechanism. For instance, pumps and reversing valves which require lubrication constitute a possible source of flavor contamination.

According to our invention the metering device is actuated by water main pressure, and the operation is controlled by separate solenoid valves rather than by a reversing valve.

Another object is to provide a metering device which also serves as a cutoff valve and to locate it on the line side of the water heater to avoid development of excessive pressures.

Other objects, features and advantages of our invention will become apparent as the description proceeds.

With reference now to the drawings in which like reference numerals designate like parts:

Figure 1:
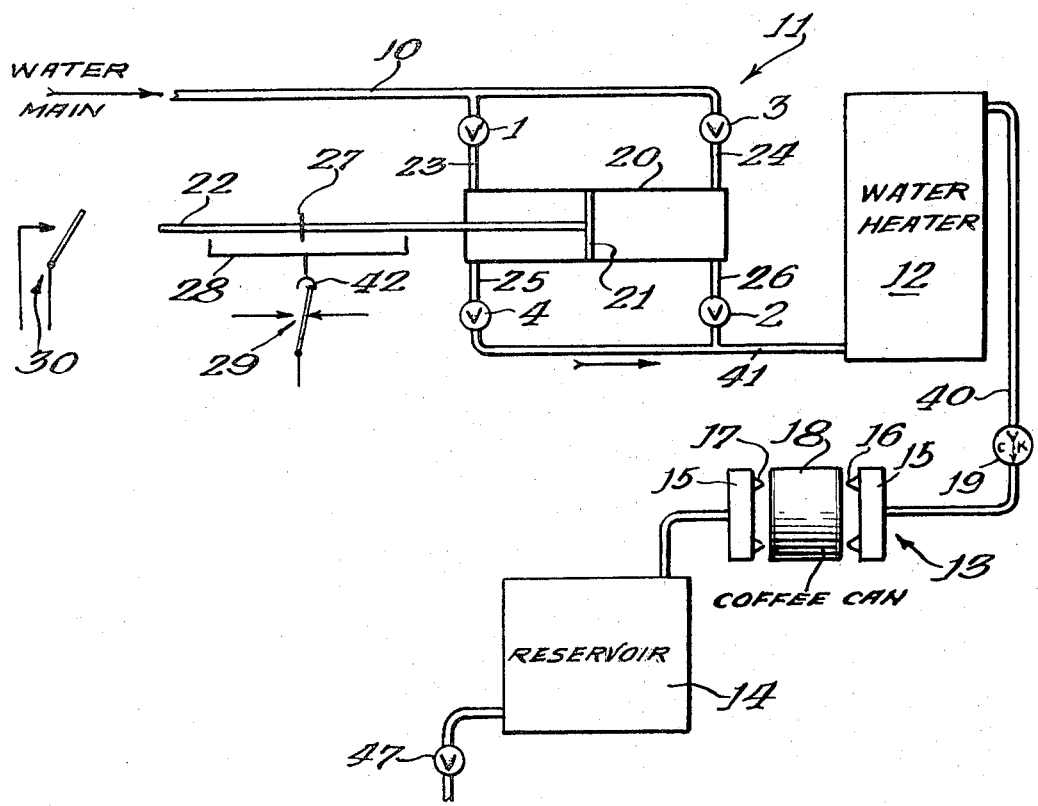
FIG. 1 is a diagram of the fluid circuit of a coffee making apparatus embodying our invention and showing the piston actuated switching mechanism.

The invention contemplates the provision of a fluid circuit including a source of water pressure, such as a water main 10, a metering device 11, a water heater 12, an extractor 13, and a coffee reservoir 14.

Figure 4:
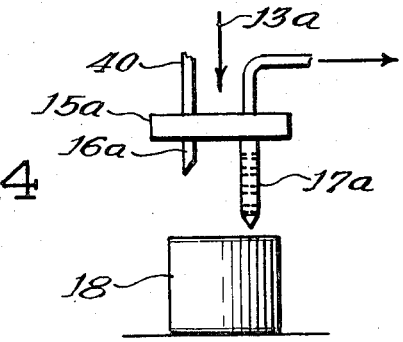
FIG. 4 shows a modified extractor.

The extractor 13 is of the can piercing type shown in Renner et al., Patent No. 2,952,202, in which a coffee can 18 is located between relatively removable plates 15 which carry piercing pins 16 and 17. Suitable means, not shown, are provided for moving one or both of the plates so that the pins 16 and 17 penetrate the end walls of the coffee can 18 so that hot water can be introduced into the can through one or more inlet pins 16 and removed from the can through one or more outlet pins 17. The hot water extracts the coffee from the ground beans contained in the can. The arrangement shown is only illustrative since both inlet and outlet piercing pins may be mounted on the same plate, 15a, as shown in FIG. 4.

A check valve 19 is preferably located in a pipe 40 which extends between the water heater 12 and the extractor 13. The check valve 19 prevents reverse flow of the water in the pipe 40.

The metering device 11 comprises a metering cylinder 20 having closed ends. A piston 21 and piston rod 22 are located within the cylinder. Inlets 23 and 24, connected to the water main 10, are provided at each end of the cylinder, and outlets 25 and 26 are provided one for each end of the cylinder, which lead to the water heater 12 through a common pipe 41. Solenoid valves 1, 2, 3 and 4 control the operation of the metering device. When inlet valve 1 and outlet valve 2 are open, the water pressure from the main will move the piston 21 to the right, forcing the water contained within the right hand side of the cylinder 20 into the water heater, thus displacing hot water which flows through pipe 40 into the extractor 13. When the piston 21 reaches the end of its stroke, solenoid valves 1 and 2 are closed, and solenoid valves 3 and 4 are opened, which causes the piston to move to the left, forcing another predetermined quantity of water into the water heater and displacing an equal quantity of hot water which is forced through the extractor. Assuming that the capacity of the cylinder is one pint, then a complete cycle of piston operation will cause one quart of water to be forced through the extractor 13. A one-pound can of coffee 18 will make about three gallons of coffee, representing twelve complete cycles of the metering cylinder and piston. Means are provided to count the piston cycles and to terminate the operation after a predetermined quantity of water, such as three gallons, has been forced through the extractor.

Figure 2:
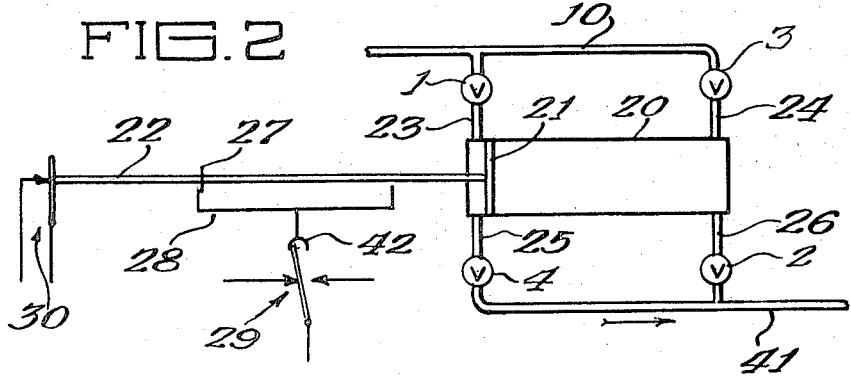
FIG. 2 is a fragmentary view showing the piston actuated switching mechanism of FIG. 1 in a changed position.

The piston rod 22 carries a lug 27 which engages a sliding yoke 28 at the end of each stroke, as shown in FIGS. 1 and 2. A reversing switch 29 is actuated by movement of the yoke 28 in either direction by means of a coupling device 42. The movable arm 45 of the reversing switch 29 is over center biased into either the left hand or right hand position, and the yoke 28 will always be in either a left hand displaced position, as shown in FIG. 2, or a right hand displaced position as shown in FIG. 1, depending upon which end of the yoke was last engaged by the lug 27. A counting switch 30 is also located for engagement by the piston rod 22 once during each complete cycle of operation. Therefore, in the example given, each time a quart of water is forced through the extractor, the counting switch 30 will be actuated to provide a single pulse.

Figure 3:
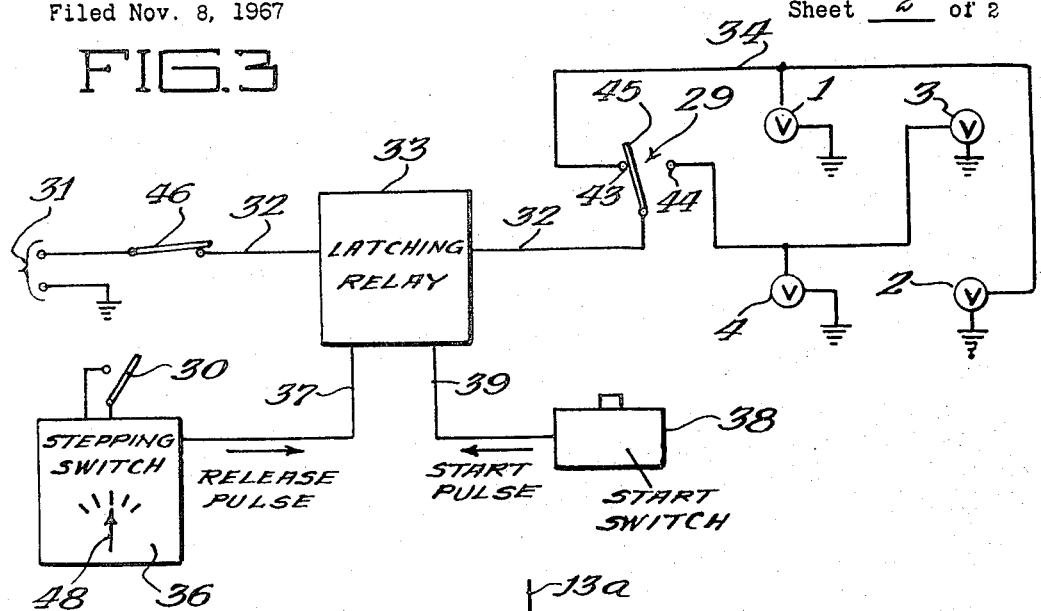
FIG. 3 is an electrical diagram illustrating the operation of the apparatus shown in FIG. 1.

As shown in FIG. 3, the reversing switch 29 has one stationary contact 43 which is connected by lead 34 to solenoid valves 1 and 2, and a second stationary contact 44 which is connected by lead 35 to solenoid valves 3 and 4. Thus, as soon as the parts move in the FIG. 2 position the valves 1 and 2 will be opened, causing the piston to move to the right to measure out one pint of water.

A lead 32 extends from one terminal of a power source 31 through a latching relay 33 to the movable contact 45 of the reversing switch 29, to energize solenoid valves 1 and 2, or 3 and 4.

The counting mechanism includes a stepping switch 36 of a type which includes an advancing coil and a re-set coil. The counting pulses from the counting switch 30 are accumulated up to a predetermined point, such as 12, at which time the stepping switch is re-set and a release pulse is sent through a pulse lead 37 to the release coil of the latching relay 33 to deenergize the circuit to the solenoid valves 1 to 4, thus cutting off any further flow of water to the fluid circuit.

A manual start switch 38 provides a starting pulse which is transmitted to the locking coil of the latching relay 33 over the pulse lead 39 to initiate operation of the latching relay into closed circuit position. An off and on switch 46 may be provided to energize the whole circuit, and may be either manually operated or actuated by the insertion of coffee can into its operative position.

To summarize the operation which has been pointed out in detail in connection with the description of the various parts, a coffee can 18 is first inserted between the plates 15, and the plates are moved toward each other by suitable means not shown herein to pierce the can. The start button 38 is then pressed to initiate operation of the latching relay 36. The pressure of the water main causes reciprocation of the piston 21 within the cylinder until the metering device 11 has operated through a predetermined number of cycles. Then a release pulse is transmitted to the latching relay 33 which closes all of the valves to terminate the extracting operation. The extracted coffee is fed into the reservoir 14 from which it may be withdrawn a cup at a time through a suitable dispensing valve 47.

A selector switch 48 is provided for the stepping switch so that the amount of water metered can be regulated, for instance, from 10 quarts to 14 quarts in the example given. This permits the operator to regulate the strength of the brew in accordance with the characteristics of the particular coffee bean.

Figure 5:
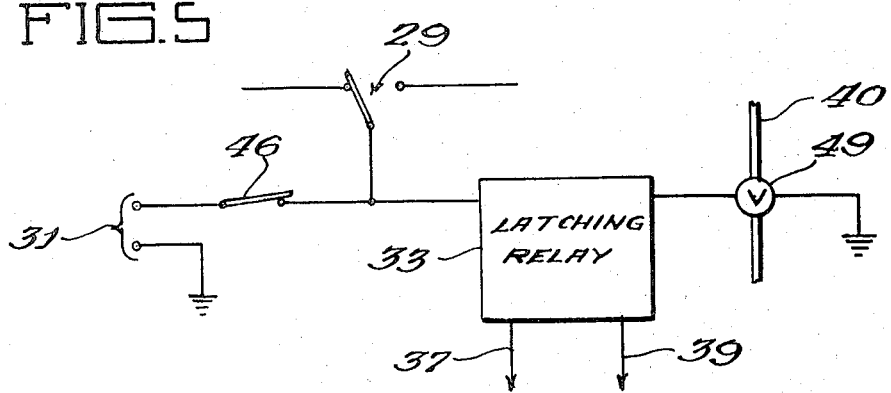
FIG. 5 shows a modified circuit arrangement for terminating the extracting cycle.

If desired, the coffee cycle may be initiated and terminated by a solenoid valve 49 in the pipe 40, as shown in FIG. 5, in which case the latching relay 33 controls the operation of valve 19 instead of the electrical circuit including the valves 1 to 4. In this arrangement, one set of valves, either 1 and 2, or 3 and 4, will be open at all times to accommodate expansion of the water within the water heater 12 back into the line 10. However, this FIG. 5 arrangement is not preferred because inadvertent operation of a shut off valve in the water main 10 would cause the development of excessive pressure within the heater 12.

In the FIG. 1 arrangement, the water expands through the pipe 40 and inlet pins 16 from which it drips down into a waste receptacle, not shown. Contraction of the water within the heater 12 will not cause reverse flow through the pipe 40 due to the check valve 19. Without the check valve, it has been found that reverse flow will draw coffee grounds into the inlet pins 16 or into the pipe 40, tending to clog same. This may occur if the can 18 is not removed immediately after the extracting operation.

The water heater 12 is thermostatically controlled to maintain the water at a temperature slightly below the boiling point such as 200° F., and the metering device 11 is located between the water heater 12 and the source of water pressure 10 so as to eliminate the heat loss which would otherwise occur if it were located between the water heater 12 and the extractor 13. The water heater and the pipe 40 are preferably insulated to reduce heat loss, as is the dispensing reservoir 14.

In a practical embodiment of the invention, Guardian Electric Catalog No. MER 115 was used for the stepping switch and Potter Blumfield Type KB17AY for the latching relay.

We claim:

1. Coffee making apparatus comprising a fluid circuit including a metering device, a water heater, an extractor, and a reservoir, said extractor comprising can piercing means for engagement with a can in which ground coffee is packed, said metering device comprising a double ended cylinder including a piston, a piston rod, an inlet means and an outlet means at each end of said cylinder, means actuated by the movement of said piston rod for reversing the flow of water through said cylinder in order to cause reciprocation of said piston within said cylinder and flow of water through said fluid circuit, counting means actuated by the movement of the piston rod, and means actuated by said counting means to terminate the flow of water through said fluid circuit.

2. Coffee making apparatus as claimed in claim 1 in which said water heater is located between said metering device and said extractor, and a check valve located between said water heater and said extractor.

3. Coffee making apparatus comprising a fluid circuit including a metering device, a water heater, an extractor, and a reservoir, said extractor comprising can piercing means for engagement with a can in which ground coffee is packed, said metering device comprising a double ended cylinder including a piston, a piston rod, an inlet means and an outlet means at each end of said cylinder, a solenoid valve for each inlet means and each outlet means, switch means actuated by the movement of said piston rod to control said solenoid valves in order to cause reciprocation of said piston within said cylinder and flow of water through said fluid circuit, counting means actuated by the movement of the piston rod, and means actuated by said counting means to terminate the flow of water through said fluid circuit.

4. Coffee making apparatus as claimed in claim 3 in which said terminating means includes relay means for closing all of said solenoid valves.

5. Coffee making apparatus as claimed in claim 3 in which said water heater is located between said metering device and said extractor.

6. Coffee making apparatus as claimed in claim 3 in which said metering device includes a reciprocating member displaceable into either one of two positions and engaged by said piston rod at the end of its stroke in either direction, said switch means comprising a two-pole switch having a first pole connected to the solenoid valves associated with an inlet at one end of said cylinder and an outlet at the opposite end, and having a second pole connected to the solenoid valves associated with the outlet at said one end of said cylinder and the inlet at said opposite end, and having a movable contact operated by said reciprocating member.

7. Coffee making apparatus as claimed in claim 3 in which said counting means includes a counting switch located for engagement by said piston rod at the end of its stroke in one direction only, and a stepping switch connected to said counting switch for accumulating the number of operations of said counting switch, said terminating means including a latching relay having a release coil connected to the output of said stepping switch and having a locking coil, and a manually operated starting switch connected to said locking coil.

References Cited

UNITED STATES PATENTS

| 2,943,556 | 7/1960 | Egi | 99—283 |
| 3,085,495 | 4/1963 | Rosander | 99—283 |
| 3,260,190 | 7/1966 | Levinson | 99—295 |
| 3,356,011 | 12/1967 | Parraga | 99—295 X |

ROBERT W. JENKINS, *Primary Examiner.*